United States Patent
Aue et al.

(10) Patent No.: US 11,734,200 B2
(45) Date of Patent: Aug. 22, 2023

(54) METHOD FOR ACCESSING DATA IN AN EXTERNAL MEMORY OF A MICROCONTROLLER

(71) Applicant: Robert Bosch GmbH, Stuttgart (DE)

(72) Inventors: Axel Aue, Korntal-Muenchingen (DE); Martin Assel, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/448,802

(22) Filed: Sep. 24, 2021

(65) Prior Publication Data
US 2022/0114114 A1    Apr. 14, 2022

(30) Foreign Application Priority Data
Oct. 13, 2020    (DE) .......................... 102020212897.9

(51) Int. Cl.
*G06F 13/10*    (2006.01)
*G06F 13/00*    (2006.01)

(52) U.S. Cl.
CPC .................. *G06F 13/102* (2013.01)

(58) Field of Classification Search
CPC ............................ G06F 13/102; G06F 13/00
USPC ........................................................... 710/5
See application file for complete search history.

(56) References Cited

U.S. PATENT DOCUMENTS

| | | | | |
|---|---|---|---|---|
| 9,081,728 | B2* | 7/2015 | Zhu | G06F 11/1453 |
| 10,438,133 | B2* | 10/2019 | Vachhani | G06N 20/00 |
| 10,936,412 | B1* | 3/2021 | Visvanathan | G06F 12/0866 |
| 11,347,739 | B2* | 5/2022 | Hamada | G06F 16/285 |
| 11,397,689 | B2* | 7/2022 | Choi | G06F 12/1054 |
| 2015/0178010 | A1* | 6/2015 | Chang | G06F 3/064 711/170 |
| 2016/0140045 | A1* | 5/2016 | Bergeron | H04L 69/22 711/105 |
| 2019/0324981 | A1* | 10/2019 | Counts | G06F 16/335 |
| 2021/0019094 | A1* | 1/2021 | Ohnishi | G06F 3/1258 |
| 2021/0365384 | A1* | 11/2021 | Goss | G06F 12/0246 |

\* cited by examiner

*Primary Examiner* — Christopher B Shin
(74) *Attorney, Agent, or Firm* — Norton Rose Fulbright US LLP; Gerard Messina

(57) ABSTRACT

A method for accessing data in an external memory of a microcontroller, the microcontroller having an internal memory. The method includes: providing a classification data record in the internal memory, the classification data record for data stored in segments in the external memory including a segment-data classification for each segment, the segment-data classification characterizing the data stored in the respective segment; and a read access in which data corresponding to a predetermined data classification are read from the external memory. The read access includes checking a segment, the segment-data classification of the segment being read from the internal memory during the checking and being compared to the predetermined data classification, and: if the segment-data classification read corresponds to the predetermined data classification, reading the data stored in the segment from the external memory, or, if the segment-data classification does not correspond, resuming with the checking step for a further segment.

13 Claims, 2 Drawing Sheets

METHOD FOR ACCESSING DATA IN AN EXTERNAL MEMORY OF A MICROCONTROLLER

CROSS REFERENCE

The present application claims the benefit under 35 U.S.C. § 119 of German Patent Application No. DE 102020212897.9 filed on Oct. 13, 2020, which is expressly incorporated herein by reference in its entirety.

FIELD

The present invention relates to a method for accessing data in an external memory of a microcontroller, as well as a processing unit and a computer program for its implementation.

BACKGROUND INFORMATION

In embedded systems, for instance, control units of machines or vehicles, microcontrollers are used which, in addition to one or more processor cores, have a certain limited number of internal working memories in which programs to be executed and data used by the programs are stored during the execution.

SRAM memory cells typically used as working memory in microcontrollers include multiple transistors, and accordingly, are relatively costly and painstaking to produce, which is why the working memory integrated in the microcontroller is often designed to be only large enough that it is sufficient for basic applications and the data used by them. Internal expandability of the working memory is usually not provided in microcontrollers for reasons of cost, or is not possible, since the working memory is integrated with the processor cores in a chip.

In order to also allow the execution of applications which access a larger working memory than provided in the microcontroller, an external memory may be linked via a communication interface, e.g., an SPI (Serial Peripheral Interface). This external memory may be implemented inexpensively in the form of DRAM memory cells which require only one transistor, or in the form of a flash memory.

SUMMARY

According to the present invention, a method is provided for accessing data in an external memory of a microcontroller, as well as a processing unit and a computer program for its implementation. Advantageous refinements and embodiment of the present invention are disclosed herein.

An example embodiment of the present invention employs the measure of performing read accesses to the external memory depending on whether, according to a segment-data classification stored in an internal memory of the microcontroller, the data stored in a segment of the external memory correspond to the data to be read. If this is not the case, read accesses to the external memory cease. Read accesses to the external memory are only carried out if the data stored in the segment have a segment-data classification which corresponds to the predetermined, desired data classification. In this manner, the number of necessary accesses to the external memory may be reduced, so that the effective bandwidth to the external memory is increased. This is especially the case when several programs or program tasks carry out possibly colliding accesses to the external memory, since the number of collisions is able to be reduced sharply. The example embodiment of the present invention exhibits special advantages if the internal memory allows or offers access which is fast compared to the external memory.

The speed (fast/slow) of an access includes the access time, that is, the length of time until data are available after the memory is invoked (latency period), and/or the access transmission rate, that is, the rate with which the data are transferred. Both properties of the memory itself as well as properties of the interface via which the memory is linked have influence here. For example, the internal memory may be an SRAM (Static Random Access Memory, static direct-access memory) which may be connected as a component to processor cores on a board, or may be integrated with processor cores in a chip. The external memory is connected via an interface to the microcontroller and may be an external DRAM (Dynamic Random Access Memory, dynamic direct-access memory) or flash memory, for example. In the case of external memories, the speed is influenced substantially by the interface via which it is linked to the microcontroller. Typically, a serial interface is used as interface, particularly an SPI or an interface based thereon having multiple data lines, e.g., Quad-SPI or Octa-SPI. In terms of orders of magnitude for the examples indicated, the access time in the case of internal memories may lie at 10 ns and the data rate at 10 GByte/s, and for external memories, the access time may lie at 100 ns and the data rate at 0.5 GByte/s.

In accordance with an example embodiment of the present invention, in the checking step, a comparison is carried out, during which it is determined whether data in the external memory have a segment-data classification that corresponds to the predetermined data classification. The expression "corresponds" is to be understood here to the effect that a match does not necessarily have to be exact, but rather that a match may only be partial, as well, or value ranges of classification elements may overlap.

More specifically, preferably each segment-data classification and the predetermined data classification include, independently of each other, one or more classification elements that, in particular, are selected from: an address pointer (pointing) to the stored data, a data length, a data-length range, a time stamp, a time-stamp range, a data type and an ID of the peripheral device to which the data are assigned. It is further preferred that during the check, the classification elements of the segment-data classification read are compared to the classification elements of the predetermined data classification, and it is determined that the segment-data classification read corresponds to the pre-determined data classification if at least one classification element of the segment-data classification read agrees with one classification element of the predetermined data classification and/or lies in a predetermined range; it preferably being determined that the segment-data classification read corresponds to the predetermined data classification if all classification elements of the segment-data classification read agree with corresponding classification elements of the predetermined data classification and/or lie in a predetermined range. Here, the conditions which should be present define the expression "corresponds" explicitly.

The classification elements of the predetermined data classification may differ from the classification elements of the segment-data classification. For example, the predetermined data classification may include a time range, while the segment-data classifications include a time stamp, so that during a read access, all data segments are read which have a time stamp within the predetermined time range.

In addition, the access method preferably includes a write access, in which data to be stored are stored in at least one segment in the external memory, the write access including: determining at least one segment-data classification for the data to be stored in the at least one segment; writing the data to be stored into the at least one segment in the external memory; and writing the at least one segment-data classification determined into the internal memory. Moreover, the write access preferably includes receiving the data to be stored from a peripheral device via a peripheral interface. By such a write access, advantageously the associated segment-data classification for the data to be written in each case is determined simultaneously and stored in the internal memory, that is, the classification data record is generated or augmented or altered. The segment-data classifications in the classification data record may thus be maintained at a level which relates to the current data in the external memory.

In addition, preferably an access time of the internal memory is shorter by at least 50% than an access time of the external memory and/or an access bandwidth of the internal memory is at least twice as great as an access bandwidth of the external memory. This is expedient, since the method of the present invention then brings about a gain in speed, the additional time which is needed in the checking step being more than offset by the gained time which is saved owing to read accesses not carried out (because of non-corresponding segment-data classification).

A processing unit according to an example embodiment of the present invention, e.g., a control unit of a motor vehicle or a microcontroller of such a control unit, has an internal memory which is connected to an external memory, and which is equipped to carry out all steps of a method according to an example embodiment of the present invention.

The implementation of a method according to an example embodiment of the present invention in the form of a computer program or computer-program product having program code for carrying out all method steps is also advantageous, since the costs it entails are particularly low, especially if an executing control unit is already being used for other tasks and is therefore present in any case. Suitable data carriers for providing the computer program are, namely, magnetic, optical and electrical memories like, e.g., hard disks, flash memories, EEPROMs and DVDs, among others. Download of a program via computer networks (Internet, Intranet, etc.) is also possible.

Further advantages and refinements of the present invention may be derived from the description and the figures.

The present invention is represented schematically in the figures on the basis of exemplary embodiments, and is described in the following with reference to the figures.

DETAILED DESCRIPTION OF EXAMPLE EMBODIMENTS

Figure 1:
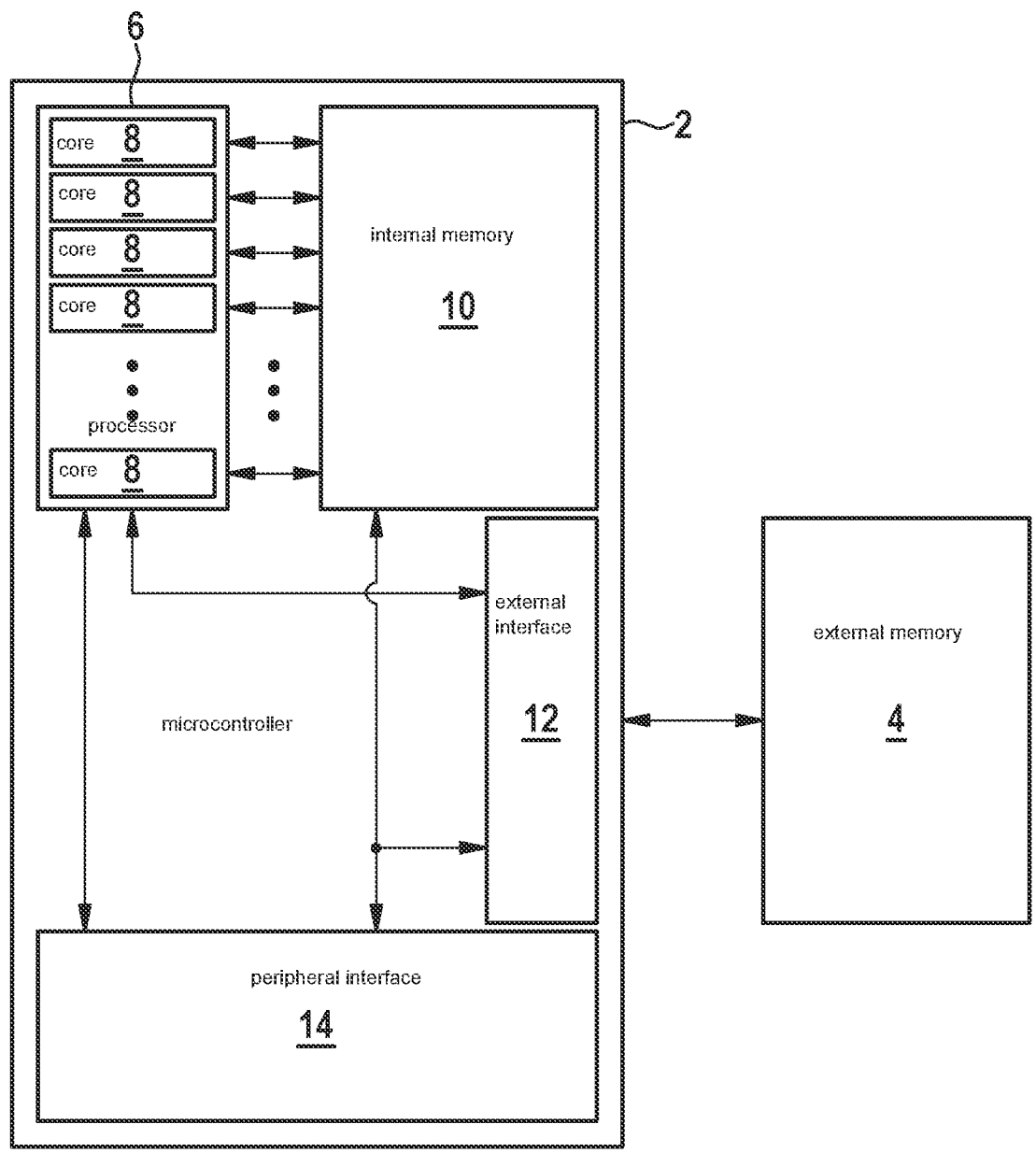
FIG. 1 shows an assembly having a microcontroller and an external memory connected to it, which may be used for a method according to an example embodiment of the present invention.

FIG. 1 shows a microcontroller 2 and an external memory 4 connected to it, which may be used in the present invention to implement a method according to the present invention. Microcontroller 2 includes a processor 6, an internal memory 10, an external interface 12 for linking external memory 4 and an (optional) peripheral interface 14 for linking external peripheral devices (not shown). Some or all elements of microcontroller 2 may be integrated in a chip.

Processor 6 has one or more processor core(s) 8, five processor cores being shown here explicitly by way of example. Internal memory 10 is connected to processor 6, typically in parallel, so that processor cores 8, that is, programs executed in them, are able to access the internal memory. Specifically, the internal memory forms the working memory of the processor. In addition, processor 6 is connected to external interface 12 for the exchange of data and, if desired, may be connected to peripheral interface 14 for the exchange of data. Moreover, peripheral interface 14 may be connected to internal memory 10 and/or external interface 12, in order to permit direct access by peripheral devices to internal memory 10 and/or external memory 4 (Direct Memory Access, DMA). These connections for the exchange of data are indicated in each case by arrows in the figure.

Internal memory 10, which is used as working memory for the processor, or rather programs executed in it, is typically an SRAM. In particular, external memory 4 may be a DRAM or a flash memory. Accesses (i.e., read and write accesses) to external memory 4 are carried out via external interface 12, whose properties influence the access time and the bandwidth of the access to the external memory accordingly. External interface 12 preferably takes the form of a serial interface—in particular, it may be an SPI—, parallel external interfaces 12 also being possible. The type of external memory and the type of external interface together ensure that accesses to the external memory are markedly slower than to the internal memory.

Peripheral interface 14 may likewise take the form of a serial or parallel interface. Here, for example, it may be an Ethernet interface, an interface for a serial bus system, especially a field-bus system, e.g., a CAN (Controller Area Network) interface, a USB (Universal Serial Bus) interface or the like. The peripheral devices may be both devices in a local network (e.g., other devices linked to a field bus, for instance, various control units in a motor vehicle or in an industrial manufacturing system) as well as devices in a non-local network (e.g., computers or other processing units that are connected via the Internet). For example, devices may be other processing units or perhaps data memories, for instance, a flash memory or a hard-disk memory.

Figure 2:
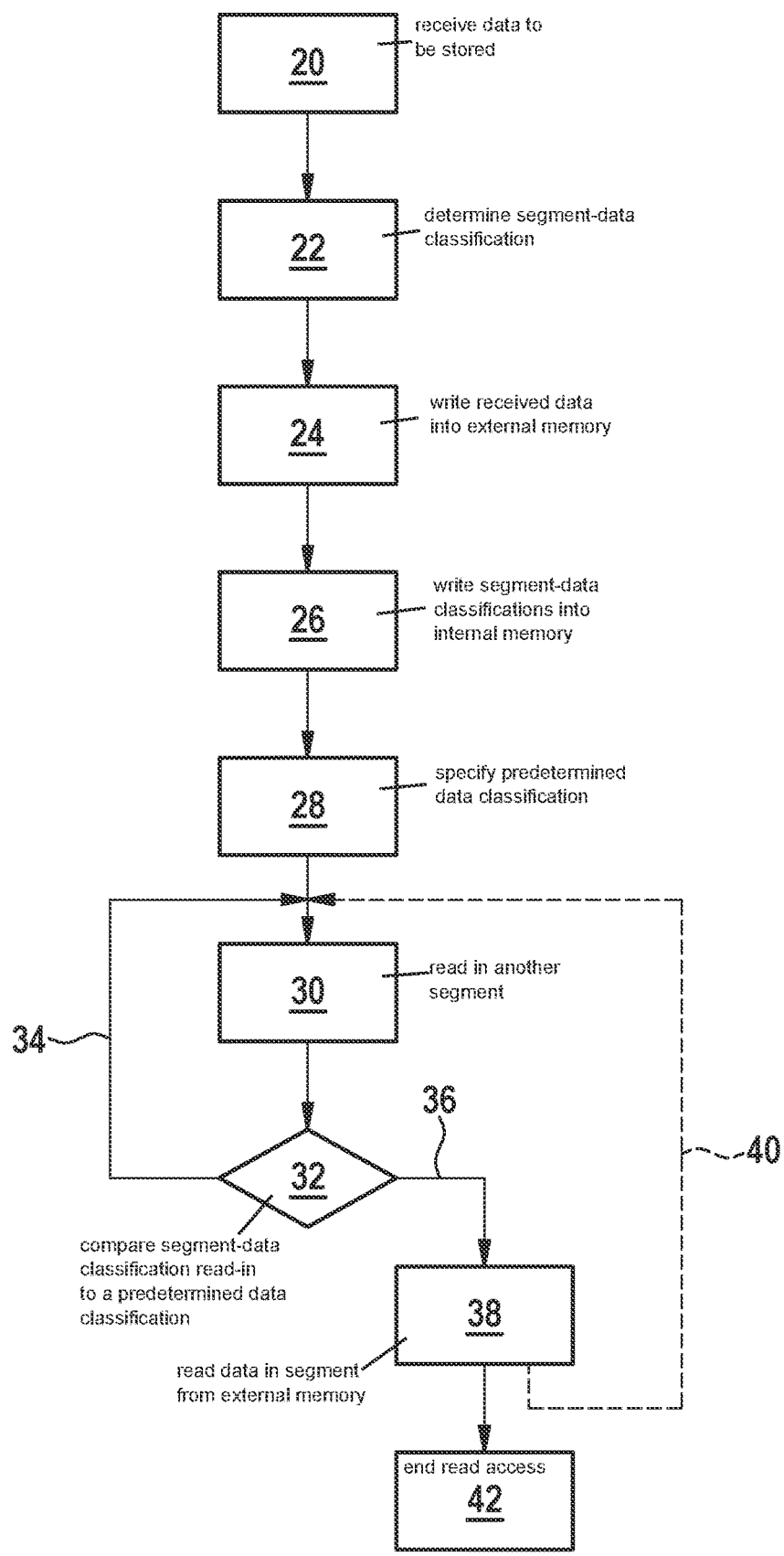
FIG. 2 shows a flowchart of one preferred method sequence according to an example embodiment of the present invention, which includes both a write access and a read access.

FIG. 2 shows a flowchart of one preferred specific embodiment of a method sequence according to the present invention, which includes both a write access and a read access.

During the write access (steps 20 through 26), data to be stored are received in step 20. The data to be stored are received preferably via an interface, e.g., a peripheral interface, in the microcontroller or are calculated in the microcontroller from other data. In step 22, a segment-data classification is determined in each case for segments of the data received, the segment-data classification characterizing the data of the respective segment. For example, this is accomplished by a computer program which is executed in the processor.

In step 24, the data received are written into the external memory. In step 26, the segment-data classifications determined are written into the internal memory, that is, a corresponding classification data record is written into the internal memory or, if a classification data record is already present, it may be augmented by the new segment-data classifications or, for example, if data in the external memory are overwritten, may also be partially replaced. Steps 24 (storing the data in the external memory) and 26 (storing the segment-data classification in the internal memory) may also be carried out simultaneously or in reverse order. Step 24 (storing the data in the external memory) may also be carried out before step 22 (determining the segment-data classification), for example, if the data are received in the processor and are written directly by it into the external memory prior to step 22, or if a peripheral device writes the data via the peripheral interface and the external interface directly into the external memory, in this case the processor then being able to read the data from the memory in order to determine the segment-data classification.

In principle, step 26 represents the step in which the classification data record is provided in the internal memory, the classification data record including a segment-data classification for each segment. In a broader sense, steps 22 and 26 of the write access (determining the segment-data classifications and writing them into the internal memory) may be viewed altogether as providing the classification data record or at least a part of it (the part which relates to the data to be stored in each case).

Alternatively or in addition (to the write access above), the classification data record may also be provided, i.e., determined directly rather than after the receipt of the data to be stored. In this case, the classification data record may be received via an interface, e.g., the peripheral interface, and stored in the internal memory. For example, the data to be stored and the classification data record may be read by the microcontroller from a data memory via the peripheral interface and written into the external memory and the internal memory, respectively. For instance, this case may occur during the start phase (boot phase) of a control unit.

Regardless of how the classification data record is provided (e.g., by the write access of steps 20-26 or by another method), a read access (steps 30 through 40) may be carried out as described in the following. In step 30, the segment-data classification for a segment to be checked having data is read from the internal memory. The segment-data classification read is compared in step 32 to a predetermined data classification.

The predetermined data classification characterizes the data which are intended to be sought in the external memory and read from it. For example, the predetermined data classification may be predetermined by a computer program that is executed in the processor and requires the corresponding data for the execution. The predetermined data classification is specified explicitly in FIG. 2 as preferred step 28, which is carried out prior to the actual read access.

If it is determined during the comparison (step 32), that the segment-data classification read does not correspond to the predetermined data classification (arrow 34), then in the event all segments have not yet been checked, the method is resumed again with step 30 for another segment to be checked, that is, the segment-data classification for the other segment not yet checked having data is read from the internal memory, and this newly-read segment-data classification is compared in step 32 to the predetermined data classification (and the method sequence is resumed as described as a function of the comparison result).

If there are no more segments that have not yet been checked, the read access may be ended.

On the other hand, if it is determined during the comparison that the segment-data classification read corresponds to the predetermined data classification (arrow 36), then the data in the segment are read from the external memory, step 38. In particular, the reading may be carried out by the computer program which has specified the predetermined data classification, or the data read may be transferred to this computer program.

After step 38, the read access may either be ended directly, step 42, or, arrow 40, if all segments have not yet been checked, the method may be resumed again with step 30 for a segment not yet checked, that is, the segment-data classification for a further segment not yet checked having data is read from the internal memory and this newly-read segment-data classification is compared in step 32 to the predetermined data classification (and the method sequence is resumed as described as a function of the comparison result). The latter is advantageous if the data sought are distributed over several segments and all segments should be read. For example, if the data classification includes an ID of a peripheral device from which the data originate, then all data could be sought which come from one specific device, it being possible that several segments with data from this specific device are present in the external memory.

The method may include multiple read accesses, each having predetermined, especially different, data classifications, the method being continued in each case as described with a new predetermined data classification starting from step 28 or 30.

What is claimed is:

1. A method for read accessing data in an external memory of a microcontroller, the microcontroller including an internal memory, the method comprising the following steps:
   providing a classification data record in the internal memory, the classification data record for data stored in segments in the external memory including a segment-data classification for each segment, the segment-data classification characterizing the data stored in the respective segment; and
   reading, via a read access in which data corresponding to a predetermined data classification are read from the external memory, the read access including:
     checking a segment to be checked of the segments, wherein, in the course of checking the segment to be checked, the segment-data classification of the segment to be checked is read from the internal memory and compared to the predetermined data classification; and:
     based on the segment-data classification read corresponding to the predetermined data classification, reading the data stored in the segment to be checked from the external memory; and,
     based on the segment-data classification read not corresponding to the predetermined data classification, resuming with the checking step for a further segment not yet checked.

2. The read access method as recited in claim 1, wherein each segment-data classification and the predetermined data classification include, independently of each other, one or more classification elements that are selected from: an address pointer to the stored data, a data length, a data-length range, a time stamp, a time-stamp range, a data type, an ID of the peripheral device to which the data are assigned.

3. The read access method as recited in claim 1, wherein it is determined that the segment-data classification read corresponds to the predetermined data classification when at least one classification element of the segment-data classification read agrees with one classification element of the predetermined data classification and/or lies in a predetermined range.

4. The read access method as recited in claim 3, wherein it is determined that the segment-data classification read corresponds to the predetermined data classification when all classification elements of the segment-data classification read agree with corresponding classification elements of the predetermined data classification and/or lie in a predetermined range.

5. The read access method as recited in claim 1, further comprising:
  writing, via a write access in which data to be stored are stored in at least one segment in the external memory, the write access including:
    determining at least one segment-data classification for the data to be stored in the at least one segment;
    writing the data to be stored into the at least one segment in the external memory;
    writing the at least one segment-data classification determined into the internal memory.

6. The read access method as recited in claim 5, further comprising:
  receiving the data to be stored from a peripheral device via a peripheral interface of the microcontroller.

7. The read access method as recited in claim 1, wherein an access time of the internal memory is shorter by at least 50% than an access time of the external memory, and/or an access bandwidth of the internal memory is at least twice as great as an access bandwidth of the external memory.

8. A processing unit having an internal memory and an external memory, the processing unit configured to read access data in the external memory, the processing unit configured to:
  provide a classification data record in the internal memory, the classification data record for data stored in segments in the external memory including a segment-data classification for each segment, the segment-data classification characterizing the data stored in the respective segment; and
  read, via a read access in which data corresponding to a predetermined data classification are read from the external memory, the read access including:
    check a segment to be checked of the segments, wherein, in the course of checking the segment to be checked, the segment-data classification of the segment to be checked is read from the internal memory and compared to the predetermined data classification; and:
      based on the segment-data classification read corresponding to the predetermined data classification, read the data stored in the segment to be checked from the external memory; and,
      based on the segment-data classification read not corresponding to the predetermined data classification, resume with the checking for a further segment not yet checked.

9. The processing unit as recited in claim 8, wherein an access time of the internal memory is shorter by at least 50% than an access time of the external memory, and/or an access bandwidth of the internal memory is at least twice as great as an access bandwidth of the external memory.

10. A non-transitory machine-readable storage medium on which is stored a computer program for accessing data in an external memory of a microcontroller, the microcontroller including an internal memory, the computer program, when executed by a computer, causing the computer to read access data in the external memory according to a method involving the following steps:
  providing a classification data record in the internal memory, the classification data record for data stored in segments in the external memory including a segment-data classification for each segment, the segment-data classification characterizing the data stored in the respective segment; and
  reading, via a read access in which data corresponding to a predetermined data classification are read from the external memory, the read access including:
    checking a segment to be checked of the segments, wherein, in the course of checking the segment to be checked, the segment-data classification of the segment to be checked is read from the internal memory and compared to the predetermined data classification; and:
      based on the segment-data classification read corresponding to the predetermined data classification, reading the data stored in the segment to be checked from the external memory; and,
      based on the segment-data classification read not corresponding to the predetermined data classification, resuming with the checking step for a further segment not yet checked.

11. The read access method as recited in claim 1, wherein the checking is ended based on:
  the segment-data classification read corresponding to the predetermined data classification, or
  the segment-data classification read not corresponding to the predetermined data classification after no further segment remains to be checked.

12. The processing unit as recited in claim 8, wherein the checking is ended based on:
  the segment-data classification read corresponding to the predetermined data classification, or
  the segment-data classification read not corresponding to the predetermined data classification after no further segment remains to be checked.

13. The non-transitory machine-readable storage medium as recited in claim 10, wherein the checking is ended based on:
  the segment-data classification read corresponding to the predetermined data classification, or
  the segment-data classification read not corresponding to the predetermined data classification after no further segment remains to be checked.

\* \* \* \* \*